Jan. 21, 1964 H. R. KAISER 3,119,023

MAGNETIC CIRCUITS

Filed April 1, 1958 2 Sheets-Sheet 1

Harold R. Kaiser,
INVENTOR.
BY.
Edward J. Dakin
AGENT.

Jan. 21, 1964 H. R. KAISER 3,119,023

MAGNETIC CIRCUITS

Filed April 1, 1958 2 Sheets-Sheet 2

Harold R. Kaiser,
*INVENTOR.*

*BY.*

Edward J. DaRin

*AGENT.*

3,119,023
MAGNETIC CIRCUITS

Harold R. Kaiser, Los Altos, Calif., assignor to Hughes Aircraft Company, Culver City, Calif., a corporation of Delaware Filed Apr. 1, 1958, Ser. No. 725,753
2 Claims. (Cl. 307—88)

This invention relates to magnetic circuits and more particularly to magnetic circuits utilizable as control circuits in digital computers and the like.

A basic element employed in high speed automatic digital computing or control systems is a gating circuit. The gating circuit may be combined in various modes to build up the other more complex circuits for performing computing or control functions in the binary system. A gating circuit that has been widely used is a diode gate. With the development of magnetic materials having a substantially rectangular systeresis characteristic, gating circuits employing magnetic cores of this desirable characteristic have been substituted for the diode gate.

A conventional form of diode gating circuit is described in an article by E. C. Nelson appearing in the Transactions of the Institute of Radio Engineers—Electronic Computers for September 1954, pages 12–21. The binary digits processed by the diode gates described in the Nelson article may be static voltage signals and accordingly such a gating scheme is termed voltage state gating. In voltage state gating, a separate diode is required for each signal to be processed by the gating network resulting, in some instances, in very large numbers of diodes. In addition, each diode gating network requires an additional diode for the voltage signal employed to interrogate the networks. The interrogating signal is commonly referred to as a clock signal. The gating circuits utilizing diodes are most conveniently arranged to perform the logical operations of "and" and "or." The simplicity in mechanizing control systems with the basic "and" and "or" circuitry is generally recognized in the art.

Conversions have been made from the diode gating arrangements to magnetic core gating. However, magnetic gating circuits, to a large extent, have not provided the simple "and" and "or" logical circuitry of the diode gating networks. Accordingly, gating networks eliminating diodes, yet affording the simplicity of mechanization of the basic "and" and "or" circuitry are highly desirable.

It is, therefore, a general object of this invention to provide novel and improved magnetic circuits utilizable in lieu of conventional diode circuitry wherein a single magnetic core circuit serves the function of a multiplicity of diodes resulting in large savings in cost yet affording reliable circuit operation.

It is another object of this invention to provide novel and improved magnetic gating circuits requiring low currents for controlling same and which circuits are compatible with conventional transistor circuitry.

It is a further object of this invention to provide novel and improved magnetic circuits utilizing a novel control or interrogating signal configuration in combination with the magnetic core circuit for controlling the magnetic condition of the magnetic core and thereby the gating function.

It is yet another object of this invention to provide novel and improved magnetic circuits of the aforementioned character in terms of "and" and "or" logic and which circuits are operable with large current tolerances.

Further and additional objects and advantages will become apparent hereinafter during the detailed description of the embodiments of the invention which are to follow and which are illustrated in the accompanying drawings wherein.

This invention contemplates the provision of novel magnetic gating circuits providing "and" and "or" logic. The magnetic circuits employ magnetic cores exhibiting square hysteresis characteristics and which circuits may be termed current-state gating as opposed to the voltage-state gating. A single magnetic core, appropriately wound, may serve the function of a multiplicity of diodes. A separate winding, termed a control winding, is coupled to the magnetic core for each signal to be processed by the gating network. The signals applied to the control winding are coupled to the magnetic core in combination with a unitary or composite interrogating signal arranged to cause the magnetic core to completely traverse around its hysteresis loop. The presence or absence of a control signal determines the path traversed on the hysteresis loop and thereby the output signal from the gating network. The interrogating or clock signal has been advantageously arranged, without resorting to a fixed bias for the magnetic core, to provide satisfactory operation with large tolerances permissible for the clock signal. It should be noted that further advantages of this magnetic arrangement are apparent when the variations in the hysteresis characteristics of commercially available magnetic cores are considered in conjunction with the non-criticality of the clock signals employed in the invention. When a multiplicity of magnetic cores are employed, the clock signal is arranged to provide the desired switching action for the magnetic core exhibiting the poorest coercitivity characteristic, and the remainder of the magnetic cores employed will also switch in response to the thus proportioned clock signal.

Figure 1:
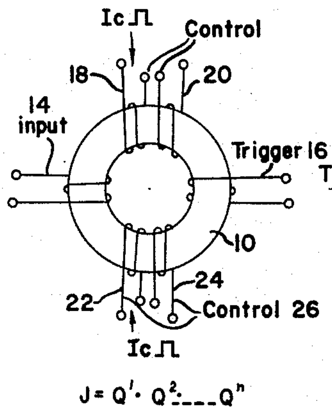
FIG. 1 is a schematic representation of a magnetic core and the associated windings therefor as utilized in the invention.
Figure 4:
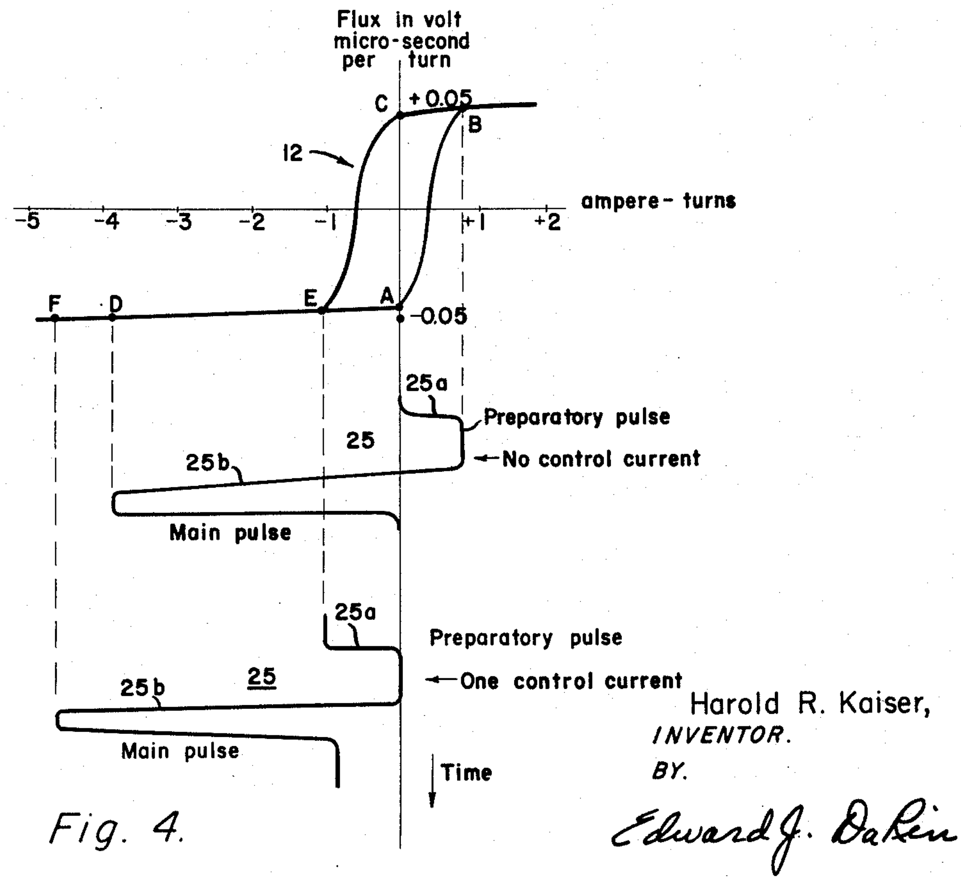
FIG. 4 is a graphical representation of a typical rectangular hysteresis characteristic of the magnetic core of FIG. 1, with the input waveform of FIG. 2 positioned on the vertical axis, plotted as a time axis, in conformance with the value of the control currents applied to the magnetic circuit.

The magnetic gating scheme employs the magnetic core 10 having a unique flux path and a substantially rectangular hysteresis characteristic, as shown in FIG. 4, and identified by the general reference character 12. The opposite remanence points are identified as A and C on the hysteresis loop 12. In FIG. 1, the magnetic core 10 is provided with a plurality of windings arranged thereon, in this instance, so that the core 10 will function as a logical "and" gate. The plurality of windings include an input winding 14 magnetically coupled to the core 10 and an output winding, identified as the trigger winding 16, and a plurality of control windings shown as the four windings 18, 20, 22 and 24. The number of control windings on any one logical "and" gate will depend on the particular logic to be mechanized in terms of this gating scheme.

Figure 2:
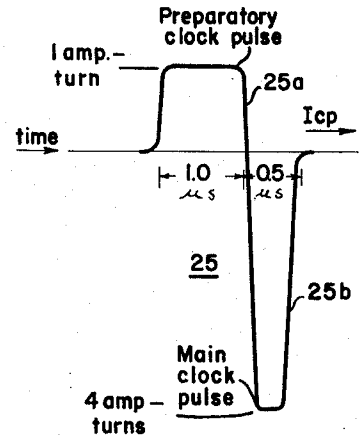
FIG. 2 is a graphical representation of a typical input or interrogating signal waveform applied to the magnetic element of FIG. 1.

The input winding 14 is arranged to be connected bidirectionally, that is, connected in a circuit without polarizing diodes, to an interrogating signal source or clock pulse source (not shown) and which clock pulse source is adapted to provide a clock pulse having a signal wave shape 25 substantially as illustrated in FIG. 2. This clock pulse waveform 25 differs from conventional clock pulses in that the application of a composite pulse defined in this manner causes the magnetic core 10 to make a complete excursion around its hysteresis loop 12 upon each application of the wave 25 to the core 10.

It will be recalled that in conventional magnetic core circuitry, a clock pulse generally is arranged for switching a magnetic core to only one stable position. Also, when a magnetic core has a fixed bias to place it in a predetermined state, the conventional clock pulse configurations applied must be proportioned to overcome this bias to provide the desired switching action, and the current requirements for reliable operation are relatively exacting. The clock pulse defined in accordance with this invention is utilized with the core biased substantially to zero, allowing rather large tolerances in both portions of the clock signal.

The clock pulse 25 comprises two portions: a positive portion identified as a preparatory clock pulse 25*a* and a negative portion identified as the main clock pulse 25*b*. The preparatory clock pulse 25*a* is arranged to apply positive ampere-turns to the magnetic core 10 while the main clock pulse 25*b* applies negative ampere-turns to this core. The clock pulse 25 is defined so that the volt-time integral per turn generated in the trigger winding by the preparatory clock pulse 25*a* is ideally equal and opposite to that generated in the trigger winding by the main clock pulse 25*b*. This volt-time integral is arranged to have a value substantially equal to twice the saturation flux of the core. By way of explanation, the preparatory clock pulse 25*a* is proportioned to switch the magnetic core 10 from a condition of magnetic remanence, such as point A to the saturation point B on the hysteresis loop 12, from where it traverses the indicated curve to the remanent position C. The main clock pulse 25*b* is effective to switch the magnetic core 10 from the remanent point C to saturation point E, in the absence of control signals.

Figure 3:
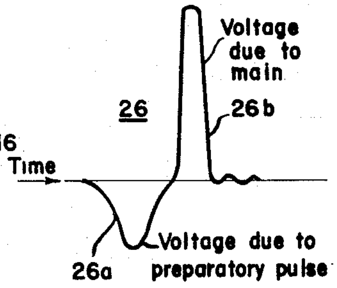
FIG. 3 is a graphical representation of a typical output signal waveform derived from the magnetic element of FIG. 1 upon the application of the input signal waveform of the type shown in FIG. 2.

With the above structure and explanations in mind, the operation of the gating arrangement will be explained, assuming for the present that there is no current applied to any of the control windings 18—24. Upon the application of the clock pulse 25 to the input winding 14, the magnetic core 10 will respond thereto by traversing the hysteresis loop 12 from the point A by travelling up the loop to the saturation point B and back around through the points CEDE, and from saturation point E back to its original position of remanence at point A. This traversal of the hysteresis loop 12 may be appreciated from an examination of the clock pulse 25 plotted on the vertical axis for the loop 12 and immediately below same. This vertical axis is representative of the passage of time, increasing from top to bottom. It will be readily appreciated, by those skilled in the art, that by this traversal of the hysteresis loop 12, a voltage will be induced in each of the windings coupled to the magnetic core 10, including the trigger winding 16. The voltage derived from the trigger winding 16 may be utilized to "trigger" a transistor arranged as a bistable element or flip-flop circuit, for example, as will be explained more fully hereinafter. A typical output waveform 26 derived from the trigger winding 16 upon the application of the clock pulse 25 is shown in FIG. 3. The negative portion 26*a* of the output waveform corresponds to the application of the preparatory clock pulse portion 25*a* of clock pulse 25, resulting in an output voltage of a relatively small amplitude. The voltage generated by the main clock pulse portion 25*b* of clock pulse 25 in the trigger winding 16 is a sharp spike, on the order shown by the positive portion of the output waveform 26*b*.

Assuming that a current is applied to at least one of the control windings, such as the winding 18, the operation of the magnetic core 10 will be further investigated. The application of current to the control winding 18 acts to effectively bias the core 10 to one of its saturation points in the same direction of remanence as the point A, in this instance, the point E on the hysteresis characteristic 12 will be selected. This biasing effect is shown in FIG. 4 by the displacement, to the left, of the clock pulse 25 on the vertical time axis. Upon the application of the clock pulse 25 to the winding 14 so that the portion 25*a* occurs substantially simultaneously with the occurrence of a control signal, the magnetic core 10 will now traverse only a portion of the hysteresis loop 12, namely, the minor path or loop EAEFE, and theoretically the flux in the magnetic core 10 will remain essentially unchanged. The preparatory clock pulse 25*a* applied during the coexistence of the control signal will merely drive the magnetic core 10 from the saturation point E to the remanent point A and allow the core to slide back to point E. The main clock pulse 25*b* merely drives the magnetic core 10 further into saturation, to a point such as point F and returning the core to the saturation point E. Accordingly, the voltage induced in the windings coupled to the magnetic core 10 during the energization of a control winding will be essentially zero. Actually, however, a small voltage will appear in the trigger winding 16. The effect of applying currents to more than one control winding substantially simultaneously, will effectively bias the magnetic core 10 further in the negative ampere-turn direction so that the induced voltage due to the clock pulse 25 is still zero.

The usage of the term "and" gate in accordance with this gating scheme will now be appreciated. The magnetic core 10 will function as an "and" gate to produce a desired triggering signal only when no current is applied to any of the control windings 18—24 to oppose the preparatory clock pulse 25*a*, so as to produce substantially no output signal at the trigger winding 16. If the currents in the control winding are denoted by the binary variables $Q^1, Q^2 \ldots Q^n$, where $Q^i=1$ indicates the absence of currents, then there will be voltage induced in the windings and in particular in the trigger winding 16 during the existence of the clock pulse 25 only when $$Q^1.Q^2 \ldots Q^n=1$$

and if the presence of a voltage pulse in the trigger winding is denoted by $J=1$ then $$J=Q^1.Q^2 \ldots Q^n \qquad (1)$$

Therefore, the single core 10 will act as an "and" gate of many terms, limited only by the space available on the magnetic core employed for control windings.

If the trigger windings of a number of cores are connected in series, and the presence of a voltage pulse on the combination is denoted by $J=1$, then $$J=Q^1.Q^2 \ldots Q^n+Q^p.Q^q \ldots Q^r+ \ldots +Q^s.Q^t \ldots Q^u \qquad (2)$$

where $Q^1, Q^2, \ldots, Q^n$ denote the control windings on the first core, $Q^p, Q^q, \ldots, Q^r$ denote the control windings on the second core, and so on. Thus, a number of cores with trigger windings in series act as an "or" combination of "and" gates. It can be shown that any logical expression can be represented by an expression of the form of (2). As an example, FIG. 5 shows how cores are connected to obtain the "or" logic $$J=Q^1.Q^2+Q^3.Q^4+Q^5.Q^6.Q^7.Q^8 \qquad (3)$$

Figure 5:
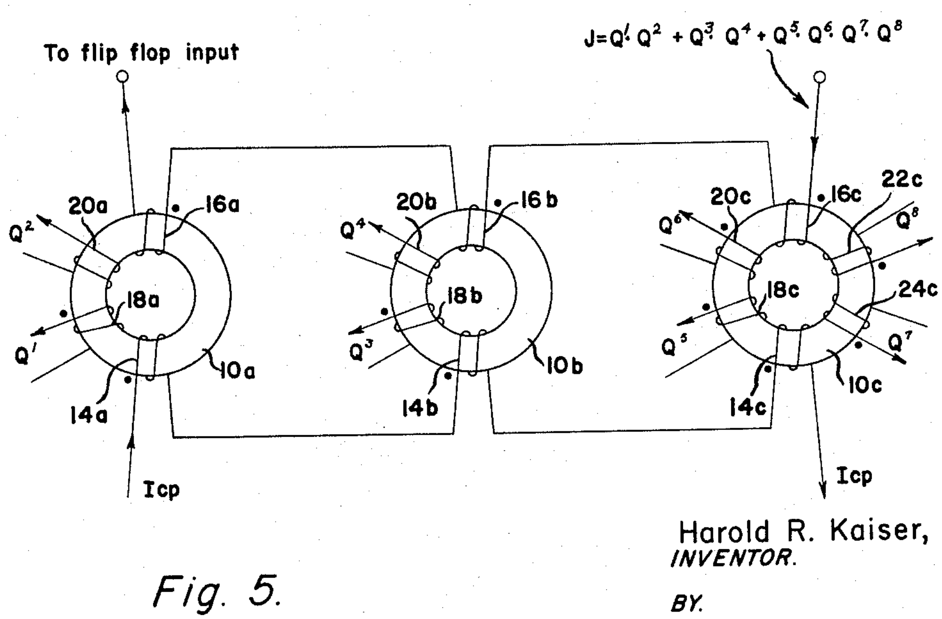
FIG. 5 is a schematic representation of a magnetic logical "or" circuit employing the magnetic circuit of FIG. 1.

The magnetic cores of FIG. 5 are each arranged in the same fashion as the magnetic core 10 of FIG. 1, that is, the cores, identified as the cores 10*a*, 10*b*, and 10*c* with the respective input, control and trigger or output windings identified by the same reference number with the corresponding superscripts *a*, *b* and *c* therefor. The input windings 14*a*, 14*b* and 14*c* are each connected together in bidirectional series circuit relationship and in the same magnetic sense with respect to their cores, while the corresponding output windings 16*a* . . . 16*c* are also connected in series circuit relationship in the same fashion.

Thus, the clock pulse 25 is applied substantially simultaneously to the input windings 14*a* . . . 14*c* and each core will function as an "and" gate as described hereinabove and will provide an output signal in the corresponding winding 16*a* . . . 16*c* only in the event of the absence of a control signal. The logical "or" function results then if any one core 10*a* . . . 10*c* does not have a control signal applied thereto, or alternatively if at least one control signal is present in one of the windings 18*a*, 20*a* . . . 18*c* . . . 24*c*. This "or" function corresponds to logic represented by the algebraic Expression 3 hereinabove.

Figure 6:
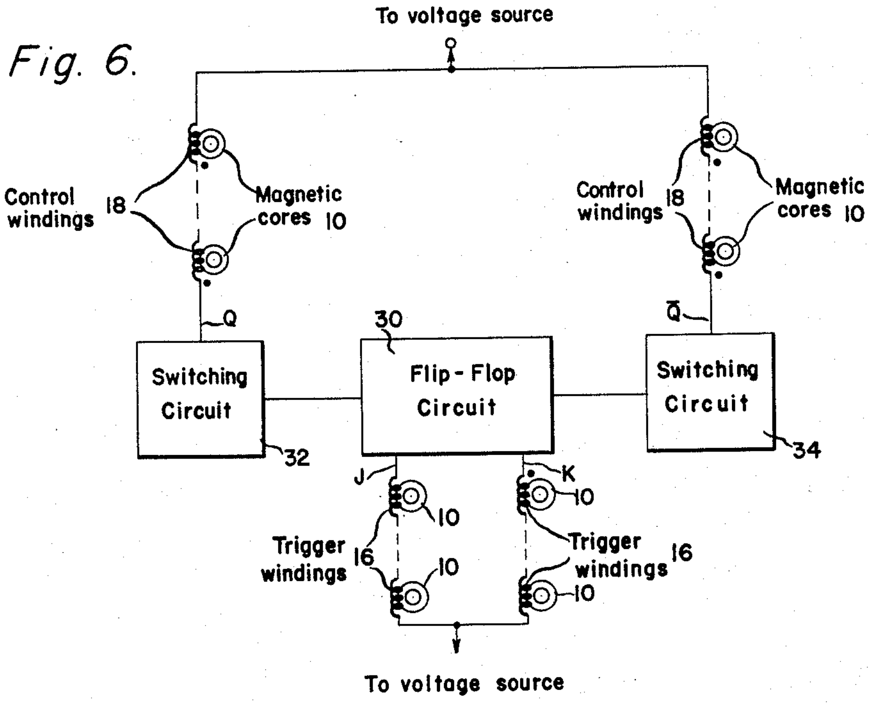
FIG. 6 is a block diagram of control circuitry for the magnetic circuits of the invention.

Now referring to FIG. 6, the control circuitry employing a conventional flip-flop circuit for energizing the magnetic circuits of this invention will be described. The flip-flop circuit is represented by the block 30 with its input circuits identified in a conventional fashion as the J and K inputs. The trigger windings 16 for the magnetic cores 10 are grouped in pairs and are shown connected in serial relationship with the individual J and K input circuits for the flip-flop 30. It will be appreciated from the above discussion that the serial arrangement of the trigger windings 16 is that shown in FIG. 5 for the logical "or" operation. The output circuits for the flip-flop 30 are represented by the conventional nomenclature Q and $\overline{Q}$ and individual switching circuits 32 and 34 are connected to control the Q and $\overline{Q}$ outputs of the flip-flop. The switching circuit 32 in the Q output is connected in series circuit relationship with the control windings generally identified by the reference character 18 for the magnetic cores 10. The switching circuit 34 is similarly arranged in the $\overline{Q}$ output of the flip-flop 30 to a second grouping of control windings 18 for their respective magnetic cores. The free end of the control windings 18 are connected in common to a voltage source, as shown in FIG. 6.

The logical operation of the control circuitry is such that the signals derived from the trigger winding 16 are applied to the flip-flop 30 by means of the appropriate J and K input to control the state of the flip-flop. The output of the flip-flop 30 is in turn utilized to energize the control windings 18 for the magnetic cores 10 arranged in a different logical gating circuit or different gating level, from the cores controlling the J and K input circuits. The switching circuits 32 and 34 may be any well known switching circuit such as a transistor switch arranged to apply the signals from the flip-flop 30 to the control windings 18.

The flip-flop circuit 30, also may be any conventional Eccles-Jordan circuit, either the tube or transistor version thereof. Also, as indicated in FIG. 6, the control windings 18 for the magnetic cores 10 may be connected in series circuit relationship as well as the serial connection of the input and trigger windings previously indicated.

It may now be appreciated that the objects of the invention have been realized and that novel and improved magnetic circuits have been disclosed which advance the state of the magnetics art. The magnetic gating circuits may readily replace the conventional diode gating circuits with a minimum of design yet resulting in cheaper and more reliable gating networks. The gating networks of this invention are further arranged to be compatible with conventional transistor circuitry to take advantage of the characteristics of the transistor. The current state gating arrangement disclosed may be seen to offer a high degree of flexibility with respect to direct-current voltage levels since the flip-flop inputs and outputs are A.C. coupled through the gating cores.

What is claimed as new is:

1. A magnetic circuit comprising at least a pair of magnetic cores each having a substantially square hysteresis loop, an input winding coupled to each of said cores, bi-directional circuit means connecting said input windings in a series circuit, a bi-directional circuit connected to said series circuit for applying a signal to said series connected input windings, independently effective to cause each of said cores to traverse completely around their hysteresis loops, at least a single control winding individual to and coupled to each of said cores, means for controllably applying signals to each of said control windings effective to oppose the traversal of said core around a portion of said loop in response to the signal applied to the corresponding input windings, an output winding coupled to each of said cores, and circuit means connecting said output windings in series.

2. A magnetic gating circuit comprising a plurality of magnetic cores arranged in one of two opposed states of magnetic remanence and switchable between said states, at least a single control winding coupled to each of said cores, means for applying control signals to said control windings during predetermined intervals and effective to bias the respective magnetic core further in the direction of the one state of remanence, a plurality of input windings respectively coupled to said magnetic cores and connected together in bi-directional series circuit relationship, bi-directional circuit means coupled to said series circuit for applying a composite input signal having a preparatory portion and a main portion of opposite sense to said preparatory portion, to said connected input windings in a timed relationship with the application of said control signals and independently effective, in the absence of a control signal at any of said control windings, to cause each of said magnetic cores to switch from said one state of remanence to the other state and back to said one state, the application of the preparatory portion of said composite signal to said input winding coincidentally with a control signal at any control winding being ineffective to cause the core coupled to that control winding to switch from said one state of remanence to the other state whereby the coincidence of said input and any one control signal maintains the associated magnetic core in said one state of remanence, and a plurality of output windings respectively coupled to said magnetic cores and connected together in series circuit relationship, said output windings each being effective to derive an output signal from their respective magnetic cores with each input signal application in the absence of a control signal.

References Cited in the file of this patent

UNITED STATES PATENTS

| | | |
|---|---|---|
| 2,673,337 | Avery | Mar. 23, 1954 |
| 2,806,152 | Eckert | Sept. 10, 1957 |
| 2,809,302 | Lawrence | Oct. 8, 1957 |
| 2,834,894 | Steagall | May 13, 1958 |
| 2,846,667 | Goodell | Aug. 5, 1958 |
| 2,868,999 | Garfinkel et al. | Jan. 13, 1959 |

OTHER REFERENCES

Vorndran et al.: "A system of Digital Logic Using Magnetic Core Gates and Transistor Flip-Flops." (Presented at Los Angeles Chapter Meeting, Professional Group on Electronic Computers, May 16, 1957.)